(12) United States Patent
Branson et al.

(10) Patent No.: US 8,990,635 B2
(45) Date of Patent: Mar. 24, 2015

(54) DETECTING AND RESOLVING ERRORS WITHIN AN APPLICATION

(75) Inventors: Michael J. Branson, Rochester, MN (US); John M. Santosuosso, Rochester, MN (US); Brandon W. Schulz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 13/334,399

(22) Filed: Dec. 22, 2011

(65) Prior Publication Data

US 2013/0166962 A1   Jun. 27, 2013

(51) Int. Cl.
*G06F 11/00* (2006.01)
*G06F 11/07* (2006.01)
*G06F 11/30* (2006.01)

(52) U.S. Cl.
CPC ........ *G06F 11/3065* (2013.01); *G06F 11/0709* (2013.01); *G06F 11/076* (2013.01); *G06F 11/0793* (2013.01)
USPC .......................................... 714/47.1; 714/47.2

(58) Field of Classification Search
CPC . G06F 11/30; G06F 11/3051; G06F 11/3089; G06F 11/36; G06F 11/3604; G06F 11/3608; G06F 11/3612
USPC ................. 714/10, 25, 38.1, 47.1, 47.2, 47.3; 709/231; 718/100, 101, 103, 106
See application file for complete search history.

(56) References Cited

U.S. PATENT DOCUMENTS

| | | | |
|---|---|---|---|
| 5,764,651 A * | 6/1998 | Bullock et al. | 714/708 |
| 6,654,907 B2 * | 11/2003 | Stanfill et al. | 714/16 |
| 6,714,904 B1 | 3/2004 | Torvalds et al. | |
| 7,086,066 B2 | 8/2006 | Kappel et al. | |
| 7,487,433 B2 | 2/2009 | Sivakumar et al. | |
| 7,730,364 B2 * | 6/2010 | Chang et al. | 714/47.2 |
| 2002/0184292 A1 | 12/2002 | Lal | |
| 2006/0282534 A1 | 12/2006 | Berg | |
| 2008/0256166 A1 * | 10/2008 | Branson et al. | 709/201 |
| 2008/0256384 A1 * | 10/2008 | Branson et al. | 714/4 |
| 2009/0217020 A1 * | 8/2009 | Yourst | 712/245 |
| 2010/0293532 A1 * | 11/2010 | Andrade et al. | 717/140 |
| 2011/0083046 A1 * | 4/2011 | Andrade et al. | 714/47.1 |
| 2012/0047505 A1 * | 2/2012 | Branson et al. | 718/100 |
| 2012/0110182 A1 * | 5/2012 | Barsness et al. | 709/226 |
| 2012/0179809 A1 * | 7/2012 | Barsness et al. | 709/224 |
| 2013/0031556 A1 * | 1/2013 | Branson et al. | 718/103 |
| 2013/0166961 A1 | 6/2013 | Branson et al. | |

* cited by examiner

*Primary Examiner* — Scott Baderman
*Assistant Examiner* — Joseph Kudirka
(74) *Attorney, Agent, or Firm* — Patterson & Sheridan, LLP

(57) ABSTRACT

Techniques for managing errors within an application are provided. Embodiments monitor errors occurring in each of a plurality of portions of the application while the application is executing. An error occurring in a first one of the plurality of portions of the application is detected. Additionally, upon detecting the error occurring in the first portion, embodiments determine whether to prevent subsequent executions of the first portion of the application.

13 Claims, 6 Drawing Sheets

DETECTING AND RESOLVING ERRORS WITHIN AN APPLICATION

BACKGROUND

Embodiments of the present invention generally relate to application management. Specifically, the invention relates to detecting and resolving errors occurring within a portion of a software application.

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real-time.

SUMMARY

Embodiments described herein provide a method, system and computer program product for managing errors within an application. The method, system and computer program product include monitoring errors occurring in each of a plurality of portions of the application while the application is executing. Additionally, the method, system and computer program product include detecting an error occurring in a first one of the plurality of portions of the application. The method, system and computer program product also include, upon detecting the error occurring in the first portion, determining whether to prevent subsequent executions of the first portion of the application.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
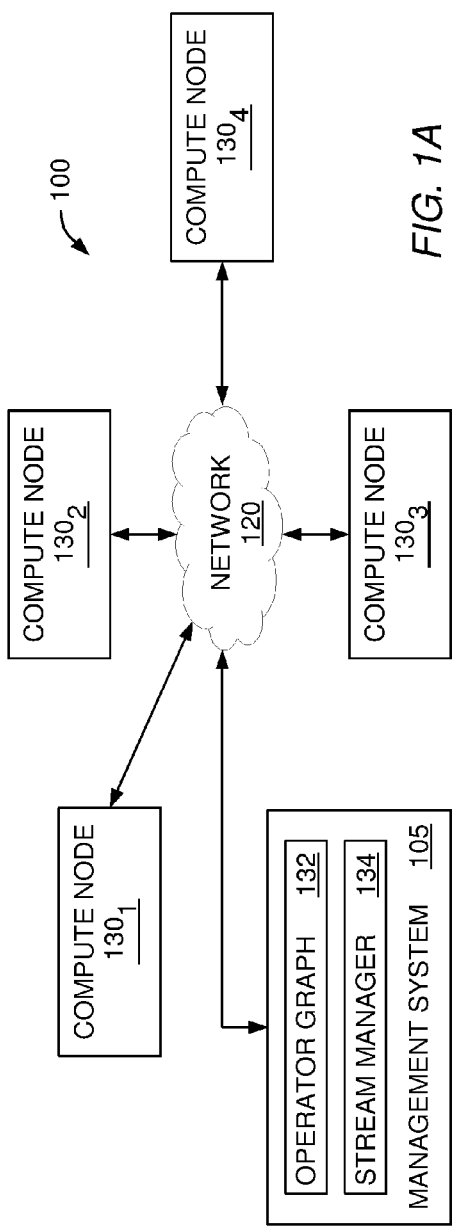
FIGS. 1A-1B illustrate a computing infrastructure configured to execute a stream computing application, according to one embodiment described herein.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream computing application, operators are connected to one another such that data flows from one operator to the next (e.g., over a TCP/IP socket). Scalability is reached by distributing an application across nodes by creating many small executable pieces of code (i.e., processing elements), each of one which contains one or more processing modules (i.e., operators). These processing elements can also be replicated on multiple nodes with load balancing among them. Operators in a stream computing application can be fused together to form a processing element. Additionally, multiple processing elements can be grouped together to form a job. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream computing application.

One advantage of stream computing applications is that they allow the user to granularly control the process flow of data through the application. In other words, the user may designate specific operators to perform various operations on the incoming data, and may dynamically alter the stream computing application by modifying the operators and the order in which they are performed. Additionally, stream computing applications are able to handle large volumes of data.

However, because stream computing applications often deal with large volumes of data, the processing of which is spread over multiple processing elements across multiple compute nodes, an operator may need to produce an output faster than it is able. Instead of requiring an operator to generate output data by processing currently received input data, an operator may instead output predetermined data. This predetermined data (or predicted output data) may be based on, for example, an average of the output data that was previously processed and transmitted by the operator. Moreover, the operator may only transmit predicted output data if the previously processed output data falls within an acceptable range. That is, if the previous output data is deterministic. An operator, or data flowing out of the operator, is "deterministic" if the values of the output data can be predicted with some minimum amount of confidence. For example, output data may be predictable or deterministic because a certain input always yields a certain output or because the output data typically has a value within a certain range—e.g., the output values for an operator are within a predefined range 80% of the time. Once the output data is deemed deterministic, using the predicted output data may allow the operator to transmit output data faster, or with less processing, than it otherwise would be able.

Moreover, the operator may output predetermined data only if there is a need to limit or stop processing received input data. For example, the stream computing application may be experiencing backpressure. "Backpressure" is a term used to describe one or more operators that are unable to transmit or receive additional data because either their buffer or a buffer associated with a downstream operator is full. In the case of some real-time applications, the operator may trade accuracy for increased data throughput where the time required for data to propagate through the stream computing application is an important factor.

One advantage of stream computing is that processing elements can be quickly moved into and out of the operator graph. Generally, operators within the processing elements can generate one or more errors under certain circumstances. For example, a particular operator could generate an exception upon being unable to connect to a remote database. While some errors may occur without affecting the output of an operator, in some circumstances, an operator experiencing errors may be affected to the point that the operator is no longer producing a meaningful result. For instance, consider an operator that enriches incoming tuples of data using data retrieved from a remote database. However, if the remote database is offline or if the operator is otherwise unable to connect to the remote database, the operator may be unable to perform its task of enriching the tuples by retrieving data from the remote database. As each operator consumes some amount of system resources (e.g., CPU cycles, memory, etc.) when executing, such system resources may be wasted when executing an operator that is producing no meaningful results.

As such, embodiments provide techniques for managing errors within an application. Embodiments may monitor errors occurring in each of a plurality of portions of the application while the application is executing. For example, embodiments may monitor each operator within the operator graph to detect errors generated by the operator. Additionally, embodiments may detect an error occurring in a first one of the plurality of portions of the application. Generally, an error broadly refers to any exception or error message (or code) generated by a software application. For example, embodiments could detect when a particular operator within the operator graph throws an exception. Upon detecting the error occurring in the first portion of the application, embodiments may determine whether to prevent subsequent executions of the first portion of the application. Continuing the example, upon detecting the particular operator has thrown an exception, embodiments may determine whether to prevent subsequent executions of the operator. If, for instance, embodiments determine that subsequent executions of the operator should be prevented, embodiments may remove the operator from the operator graph, such that no data is routed to or from the removed operator in the stream computing application.

Figure 1B:
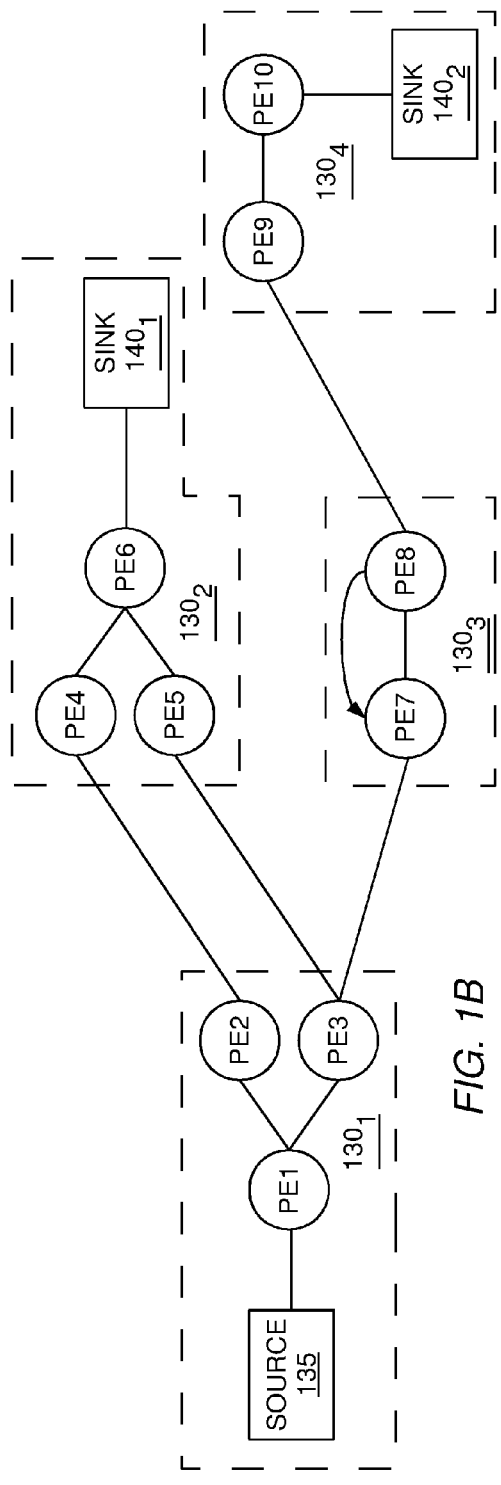

FIGS. 1A-1B illustrate a computing infrastructure configured to execute a stream computing application, according to one embodiment of the invention. As shown, the computing infrastructure 100 includes a management system 105 and a plurality of compute nodes $13_{01-4}$, each connected to a communications network 120. Also, the management system 105 includes an operator graph 132 and a stream manager 134. As described in greater detail below, the operator graph 132 represents a stream computing application beginning from one or more source processing elements (PEs) through to one or more sink PEs. This flow from source to sink is also generally referred to herein as an execution path. However, an operator graph may be a plurality of linked together executable units (i.e., processing elements) with or without a specified source or sink. Thus, an execution path would be the particular linked together execution units that data traverses as it propagates through the operator graph.

Generally, data attributes flow into a source PE of a stream computing application and are processed by that PE. Typically, processing elements receive an N-tuple of data attributes from the stream as well as emit an N-tuple of data attributes into the stream (except for a sink PE where the stream terminates). Of course, the N-tuple received by a processing element need not be the same N-tuple sent downstream. Additionally, the processing elements could be configured to receive or emit data in formats other than a tuple (e.g., the processing elements could exchange data marked up as XML documents). Furthermore, each processing element may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream computing application running on the compute nodes $130_{1-4}$, as well as to change the structure of the operator graph 132. The stream manager 134 may move processing elements (PEs) from one compute node 130 to another, for example, to manage the processing loads of the compute nodes 130 in the computing infrastructure 100. Further, stream manager 134 may control the stream computing application by inserting, removing, fusing, un-fusing, or otherwise modifying the processing elements (or what data-tuples flow to the processing elements) running on the compute nodes $130_{1-4}$. One example of a stream computing application is IBM®'s Info-Sphere® Streams (note that InfoSphere® is a trademark of International Business Machines Corporation, registered in many jurisdictions worldwide).

FIG. 1B illustrates an example operator graph that includes ten processing elements (labeled as PE1-PE10) running on the compute nodes $130_{1-4}$. Of note, because a processing element is a collection of fused operators, it is equally correct to describe the operator graph as execution paths between specific operators, which may include execution paths to different operators within the same processing element. FIG. 1B illustrates execution paths between processing elements for the sake of clarity. While a single operator within a processing element may be executed as an independently running process with its own process ID (PID) and memory space, multiple operators may also be fused together into a processing element to run as a single process (with a PID and memory space). In cases where two (or more) operators are running in independent processing elements, inter-process communication may occur using a "transport" (e.g., a network socket, a TCP/IP socket, or shared memory). However, when operators are fused together, the operators within a processing element can use more rapid communication techniques for passing tuples (or other data) between the operators.

As shown, the operator graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into the processing element PE1, which in turn emits tuples that are received by PE2 and PE3. Of note, although the operators within the processing elements are not shown in FIG. 1B, in one embodiment the data tuples flow between operators within the processing elements rather than between the processing elements themselves. For example, one or more operators within PE1 may split data attributes received in a tuple and pass some data attributes to one or more other operators within PE2, while passing other data attributes to one or more additional operators within PE3. Data that flows to PE2 is processed by the operators contained in PE2, and the resulting tuples are then emitted to PE4 on compute node $130_2$. Likewise, the data tuples emitted by PE4 flow to sink PE6 $140_1$. Similarly, data tuples flowing from PE3 to PE5

(i.e., from operator(s) within PE3 to operator(s) within PE5) also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which in turn emits tuples to be processed by sink PE10 $140_2$.

Furthermore, although embodiments of the present invention are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

Figure 2:
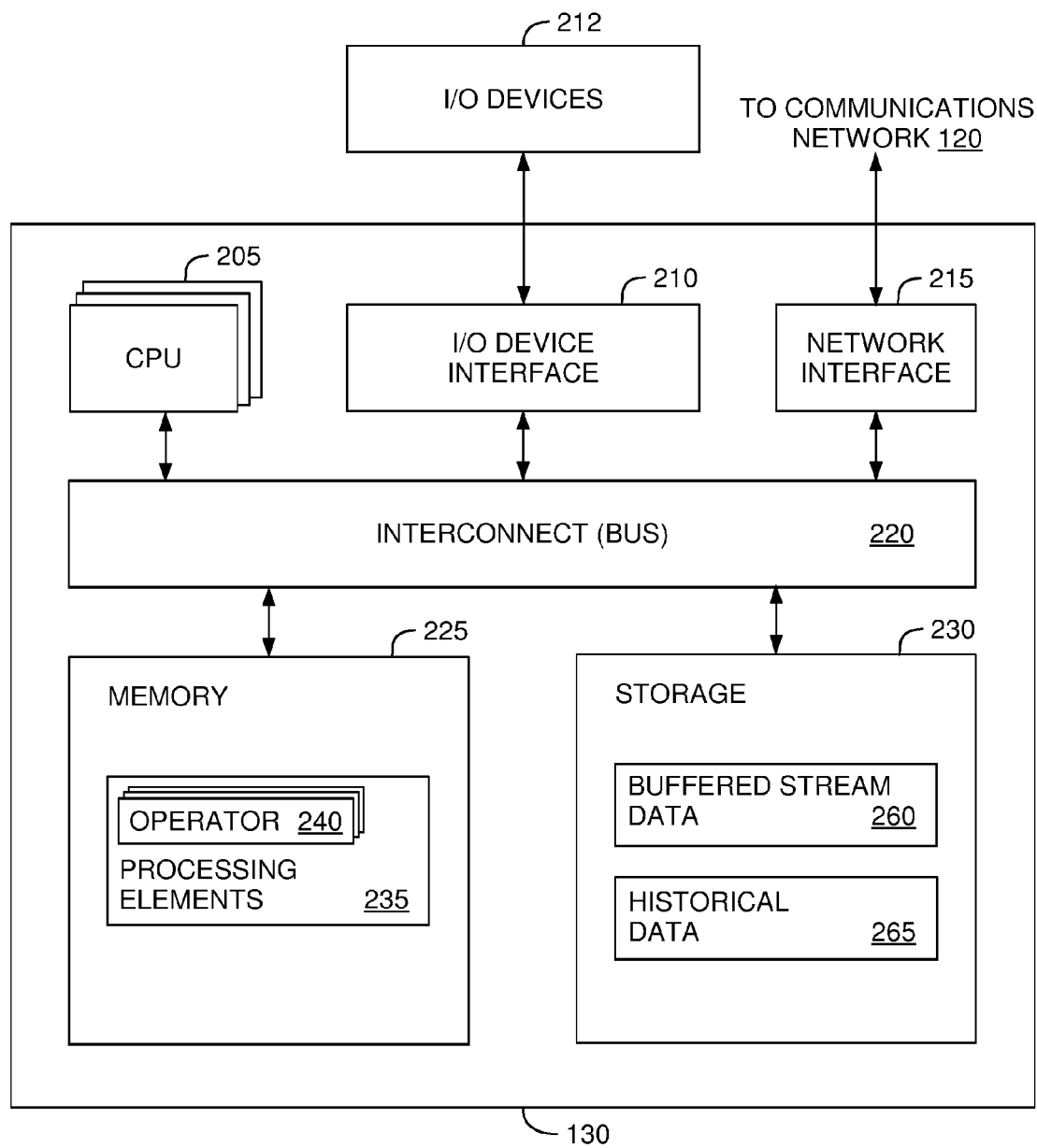
FIG. 2 is a more detailed view of the compute node of FIGS. 1A-1B, according to one embodiment described herein.

FIG. 2 is a more detailed view of the compute node 130 of FIGS. 1A-1B, according to one embodiment of the invention. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. The memory 225 is generally included to be representative of a random access memory (e.g., DRAM or Flash). Storage 230, such as a hard disk drive, solid state disk (SSD), or flash memory storage drive, may store non-volatile data.

In this example, the memory 225 includes a plurality of processing elements 235. The processing elements 235 include a collection of operators 240. As noted above, each operator 240 may provide a small chunk of code configured to process data flowing into a processing element (e.g., PE 235) and to emit data to other operators 240 in that PE and to other processing elements in the stream computing application. In the context of the present disclosure, a plurality of operators 240 may be fused in a processing element 235, such that all of the operators 240 are encapsulated in a single process running on the compute node 130. For example, each operator 240 could be implemented as a separate thread, such that all of the operators 240 can be run in parallel within a single process. The processing elements may be on the same compute node 130 or on other compute nodes accessible over the data communications network 120. Memory 225 may also contain stream connection data (not shown) which represents the connections between PEs on compute node 130 (e.g., a TCP/IP socket connection between two separate PEs 235), as well as connections to other compute nodes 130 with upstream and or downstream PEs in the stream computing application, also via TCP/IP sockets (or other inter-process data communication mechanisms).

As shown, storage 230 contains buffered stream data 260 and historical data 265. The buffered stream data 260 represents a storage space for data flowing into the compute node 105 from upstream processing elements (or from a data source for the stream computing application). For example, buffered stream data 260 may include data tuples waiting to be processed by one of the PEs 235—i.e., a buffer. Buffered stream data 260 may also store the results of data processing performed by processing elements 235 that will be sent to downstream processing elements. For example, a PE 235 may have to store tuples intended for a downstream PE 235 if that PE 235 already has a full buffer, which may occur when the operator graph is experiencing backpressure. Storage also contains historical data 265, which represents previous errors produced by the various operators 240 within the processing elements 235 in the stream computing application. Such historical data 265 could be used, for instance, to determine whether to prevent subsequent executions of one of the operators 240. For instance, the historical data 265 could be used to determine a rate of error for a particular one of the operators 240 and, if the determined rate of error exceeds a threshold rate of error, embodiments could determine that subsequent executions of the operator should be prevented.

Figure 3:
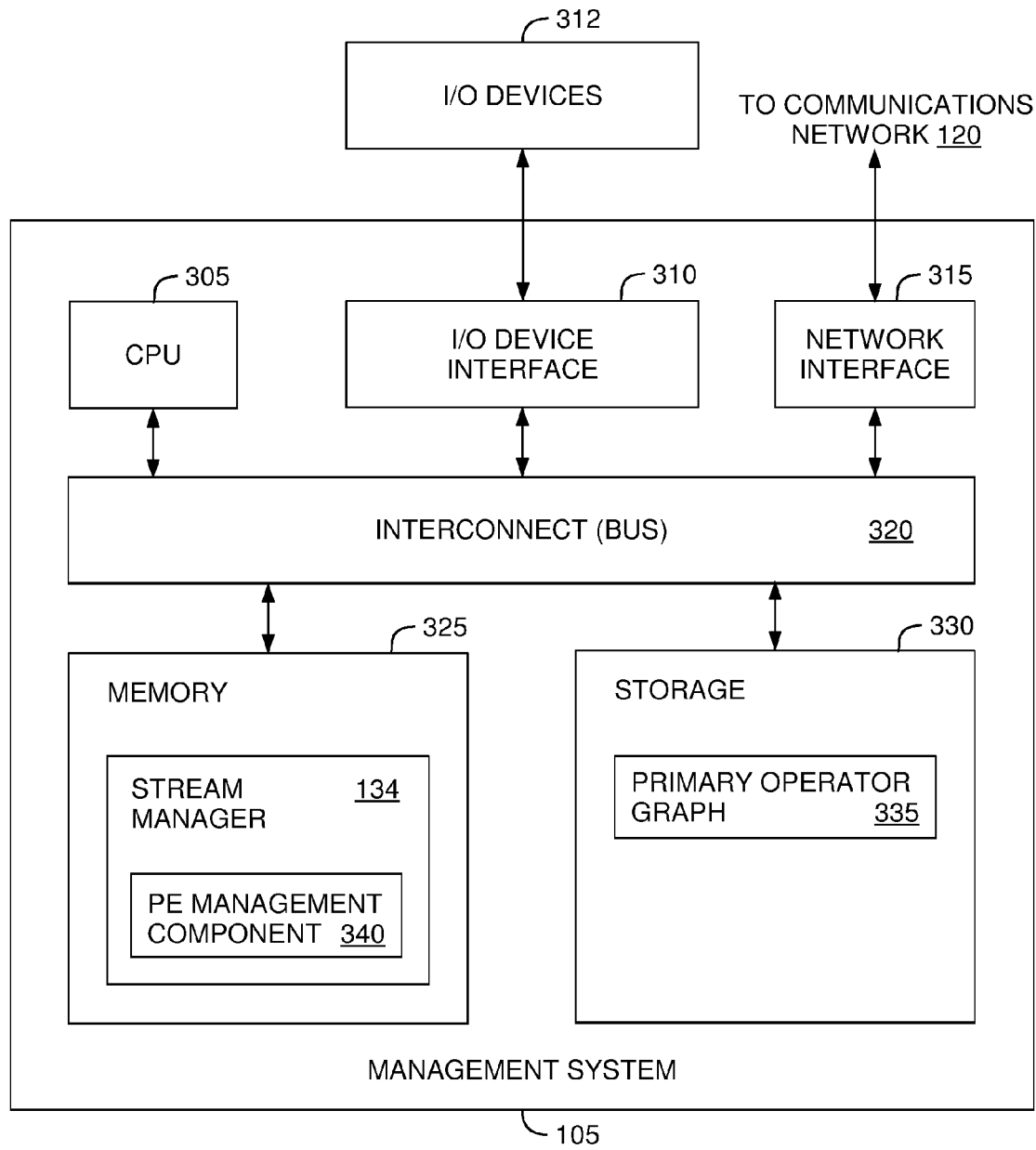
FIG. 3 is a more detailed view of the server computing system of FIG. 1, according to one embodiment described herein.

FIG. 3 is a more detailed view of the server computing system 105 of FIG. 1, according to one embodiment of the invention. As shown, server computing system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server computing system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. Additionally, the storage 330 includes a primary operator graph 335. The stream manager 134 may use the primary operator graph 335 to route tuples to PEs 235 for processing. The stream manager 134 is configured with a PE management component 340. Generally, the PE management component 340 is configured to detect and manage errors occurring within the operators 240 of the stream computing application. For instance, the PE management component 340 could determine a particular one of the operators 240 is experiencing problems when the operator throws a particular exception. As another example, the PE management component 340 could monitor an error log for the operator and could determine that the operator is experiencing problems when a particular error message is detected within the error log. Upon detecting that the operator is experiencing problems, the PE management component 340 could determine whether to prevent subsequent executions of the operator. For example, the PE management component 340 could retrieve a plurality of error profiles, each specifying one or more conditions, which, if satisfied, indicate that subsequent executions of the operator satisfying the conditions should be prevent. Upon detecting that a particular exception was thrown, the PE management component 340 could determine whether the particular exception satisfies any of the error profiles.

Additionally, the PE management component 340 could consider other errors generated by the operator. For instance, the PE management component 340 could calculate a rate at which the operator has generated errors during a period of time. The PE management component 340 could then determine whether the calculated rate of error satisfies any of the error profiles. For example, one of the error profiles could specify a threshold rate of error and the PE management component 340 could compare the calculated rate of error with the threshold rate of error to determine whether the error profile is satisfied.

If the PE management component 340 determines that subsequent executions of the operator should be prevented (e.g., if at least one of the error profiles is satisfied), the PE management component 340 could modify the operator graph 335 to remove the operator, such that no data flows to or from the removed operator within the stream computing application. The PE management component 340 could additionally terminate the problematic operator so that the operator does not wastefully consume system resources once removed from the operator graph 335. That is, since the operator has been removed from the stream computing application, there is no need to continue to expend system resources to execute the operator. For instance, if the operator is the only operator running within one of the processing elements 235, the PE management component 340 could terminate the processing element 235 containing the operator in order to free up the system resources consumed by the processing element 235. As another example, if the operator is one of several operators running within a processing element 235, the PE management component 340 could terminate only a portion of the processing element 235 that corresponds to the operator. For example, the processing element 235 could be implemented as a process running on a compute node 130, and each operator 240 could be implemented using one or more threads within the process. If the PE management component 340 determines that a particular operator is problematic and should be removed, the PE management component 340 could then terminate the corresponding one or more threads for the operator within the processing element. Advantageously, doing so avoids wasting system resources on portions of the stream computing application (i.e., operators within the stream computing application) that are no longer producing meaningful results.

Figure 4A:
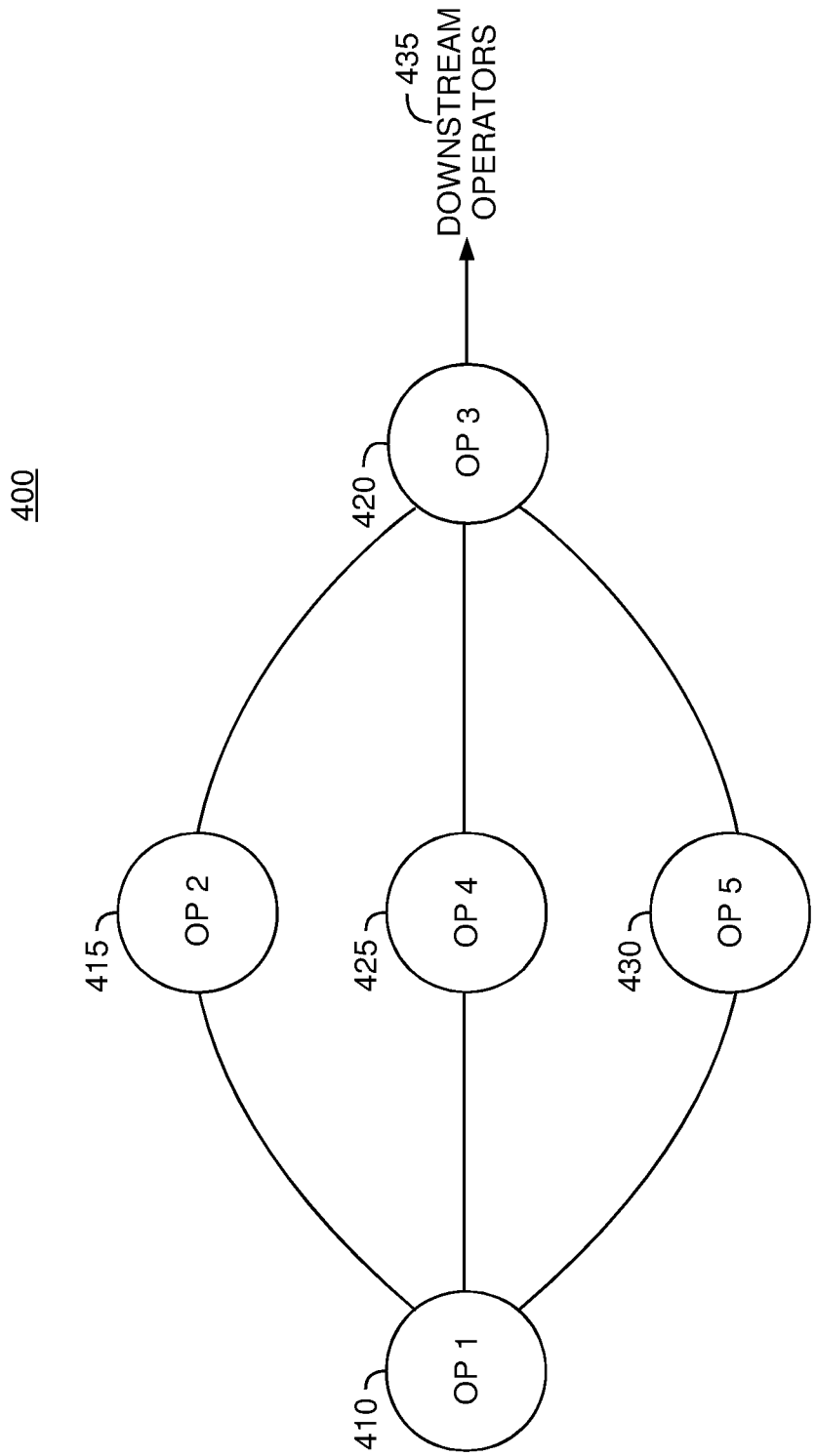
FIGS. 4A-B illustrate operator graphs of a stream computing application, according to embodiments described herein.
Figure 4B:
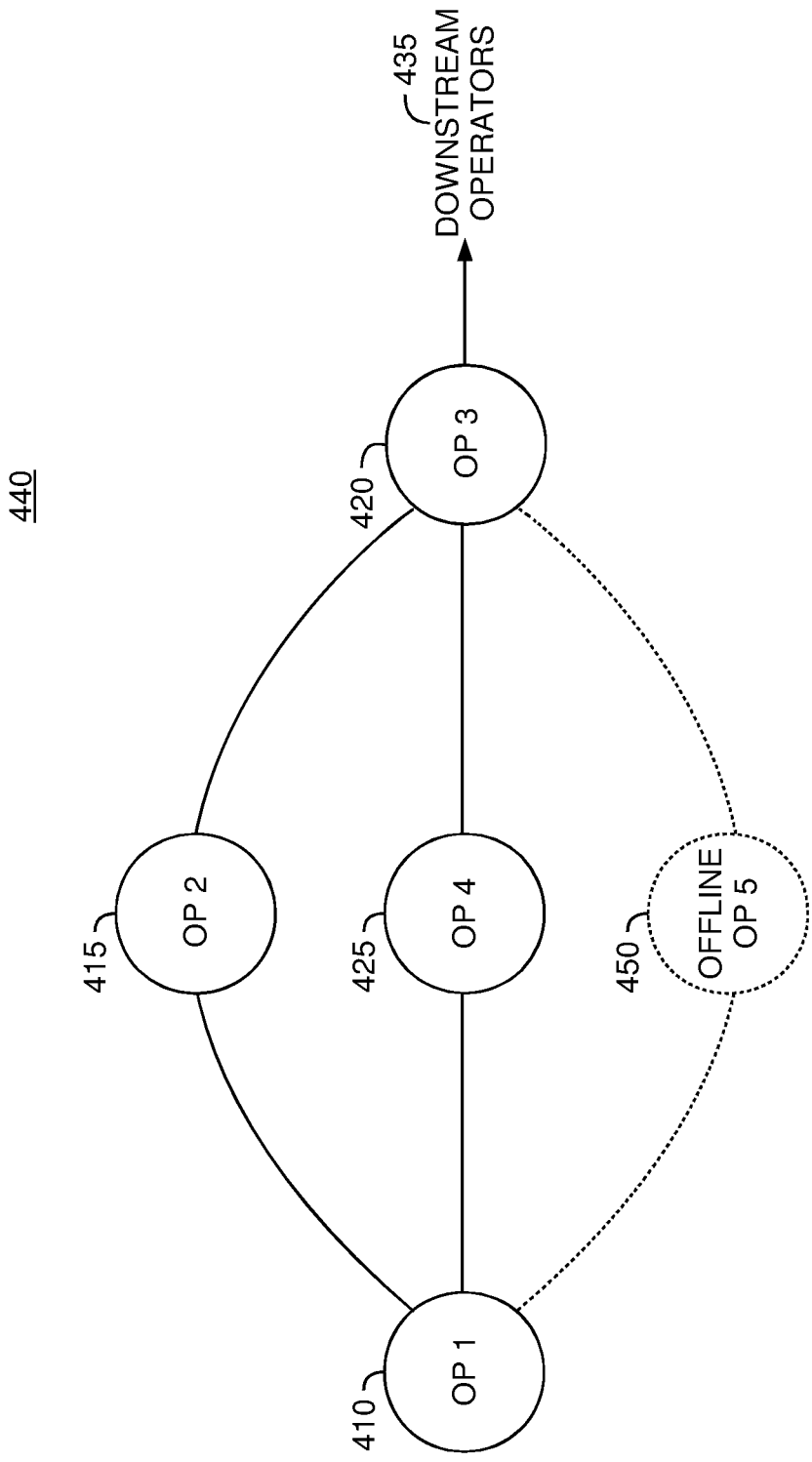

FIGS. 4A-B illustrate operator graphs of a stream computing application, according to embodiments described herein. As shown, FIG. 4A illustrates an operator graph 400 which includes an operator 410 which generates output tuples that are transmitted to operators 415, 425 and 430. Similarly, the operators 415, 425 and 430 generate output tuples which are transmitted to the operator 420, which in turn generates output tuples which are transmitted to one or more downstream operators 435. As discussed above, the depicted operators 410, 415 420, 425 and 430 may reside within one or more processing elements, executing across one or more compute nodes.

In the depicted stream computing application, a PE management component 340 could be configured to monitor each of the operators 410, 415, 420, 425 and 430 to detect when an error is generated by a respective one of the operators 410, 415, 420, 425 and 430. For purposes of the present example, assume that the operator 430 is configured to receive tuples of data from the operator 410 and to enrich the received tuples with data retrieved from a remote database. As shown, these enriched tuples are then transmitted to the operator 420 for further processing. Further, assume that the PE management component 340 determines that the operator 430 has generated an error, indicating that the remote database is unavailable. Upon detecting that the operator 430 has generated the remote database unavailable error, the PE management component 340 could determine that the operator 430 is no longer producing meaningful output for the stream computing application. That is, because the operator's 430 task is to incorporate data retrieved from the remote database into the incoming tuples but the error indicates that the operator 430 is unable to access the remote database, the operator 430 is unable to perform its task and meaningfully enrich the incoming tuples of data.

Accordingly, the PE management component 340 could determine that subsequent executions of the operator 430 should be prevented, as the operator 430 is still consuming system resources (e.g., CPU cycles, memory, etc.) but is no longer producing meaningful output. The PE management component 340 could then remove the operator 430 from the operator graph for the stream computing application, such that tuples of data will no longer flow to and from the operator 430. An example of this is shown in FIG. 4B, which depicts a modified operator graph 440 of the stream computing application where the operator 430 has been taken offline in order to prevent subsequent executions of the operator 430. The operator graph 440 includes the operator 410, which generates output tuples of data that are transmitted to the operators 415 and 425. Similarly, the operators 415 and 425 generate output tuples of data which flow to the operator 420, which in turn generates output tuples that are transmitted to the one or more downstream operators 435.

However, unlike the operator graph 400 depicted in FIG. 4A, the modified operator graph 440 includes the offline operator 450, which represents the operator 430 from FIG. 4A now removed from the stream computing application. That is, in the depicted embodiment, the PE management component 340 has determined that the operator 430 is no longer producing meaningful output values and accordingly, the PE management component 340 has taken the operator 430 offline (represented by the offline operator 450) and removed the operator 430 from the operator graph. As such, tuples of data no longer flow from the operator 410 to the operator 430 or from the operator 430 to the operator 420 in the stream computing application.

In determining that the operator 430 is no longer producing meaningful output, the PE management component 340 may consider the type of error that was detected. For instance, the operator 430 could still produce meaningful output even though the operator 430 generated a first type of error, but may not produce meaningful output upon experiencing a second type of error. For example, consider the operator described above that is configured to enrich incoming tuples using data retrieved from a remote database. If the operator generates an error indicating that the remote database is unavailable, such an error may indicate that the operator is no longer able to perform its task of enriching the incoming tuples and thus is no longer producing meaningful output. On the other hand, if the operator generates a second type of error indicating that one of the incoming tuples contained a value outside of a particular range, such an error may not indicate that the operator is unable to produce meaningful output. As such, the PE management component 340 may be configured to consider the type of the error detected in making the determination of whether subsequent executions of an operator should be terminated.

The PE management component 340 can also consider the frequency at which the operator is generating errors. Continuing the above example, if the operator generates only a single error indicating the remote database is unavailable, the PE management component 340 could determine that the operator is likely still able to produce meaningful output values. That is, since only a single error was generated, the PE management component 340 could determine that the error relates to a momentary interruption of connectivity between the operator and the remote database but that such an interruption is transitory in nature. On the other hand, if the PE management component 340 determines the operator is generating an error 80% of the time when processing incoming tuples, the PE management component 340 could determine that such a rate of error exceeds a threshold rate of error and thus could determine that subsequent executions of the operator should be prevented. More specifically, the PE management component 340 could determine that since the operator is producing an error a substantial amount of the time and because the operator is not producing any meaningful output data each time the error is generated, the PE management component 340 could determine that subsequent execution of the operator is not worth the cost of the system resources being consumed by the operator. Accordingly, the PE management component 340 could prevent subsequent executions of the operator (e.g., by removing the operator from the operator graph).

In addition to removing the problematic operator 430 from the operator graph, the PE management component 340 may terminate any executing software corresponding to the operator 430. For instance, consider an embodiment where each processing element is implemented in a separate process, and where the operator(s) within each processing element are implemented using a separate one or more threads within the respective process. In such an embodiment, the PE management component 340 could determine whether there are any other operators within the processing element in which the problematic operator 430 is located. If so, the PE management component 340 could terminate the one or more threads corresponding to the problematic operator 430 within the processing element, without disturbing the processing of the other operators within the processing element. On the other hand, if the PE management component 340 determines that the problematic operator 430 is the only operator within the processing element, the PE management component 340 could terminate the entire process for the processing element in order to free up the system resources consumed by the processing element. That is, because the problematic operator is the only operator within the processing element, there may be no need to continue running the processing element without any operators within it. Accordingly, the PE management component 340 could terminate the entire process for the processing element containing the problematic operator.

Figure 5:
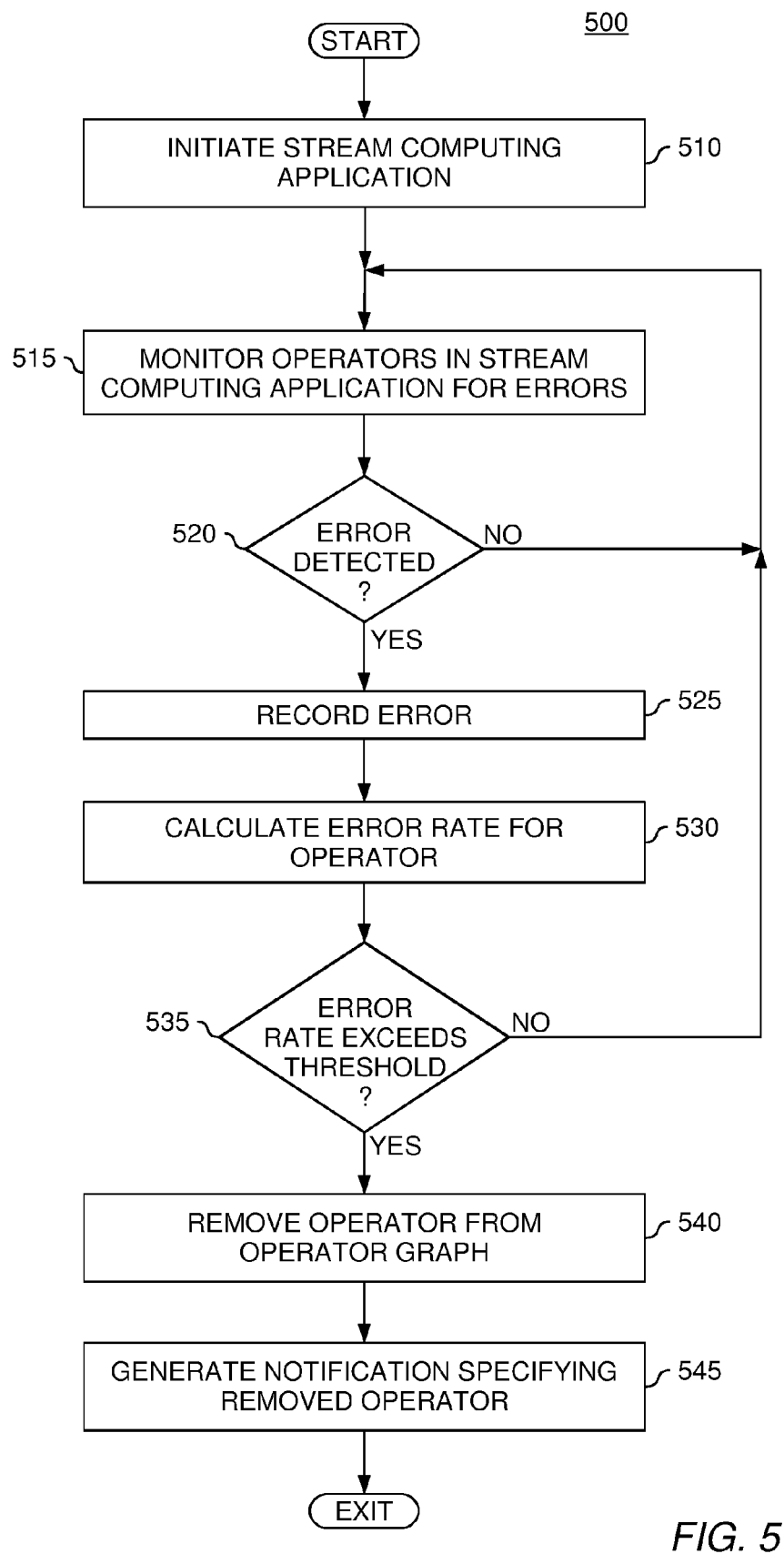
FIG. 5 is a flow diagram illustrating a method for managing errors within a stream computing application, according to one embodiment described herein.

FIG. 5 is a flow diagram illustrating a method for managing errors within a stream computing application, according to one embodiment described herein. As shown, the method 500 begins at step 510, where a stream computing application is initiated. For instance, such initiation may include executing a separate application instance for each processing element within the stream computing application, with each processing element including one or more operators (e.g., implemented with each using a separate one or more threads within the process for the processing element). As discussed above, the processing elements may be executed across one or more computer systems.

Once the stream computing application is initiated, the PE management component 340 begins monitoring operators within the stream computing application to detect when the operators generate errors (step 515). As discussed above, such an error broadly represents any exception or error message (or error code) that can be generated by a software application. For instance, to monitor exceptions generated by the operators, the PE management component 340 could be implemented at least in part as a wrapper object for the operator that is configured to catch exceptions generated by the operator. Additionally, the PE management component 340 could be configured to monitor an error log or a database to which the operator outputs error messages.

The PE management component 340 then determines whether any errors have been detected (step 520). If not, the method 500 returns to step 515, where the PE management component 340 continues monitoring operators in the stream computing application to detect errors. On the other hand, if the PE management component 340 determines an error has been detected, the PE management component 340 generates a record of the error (step 525). For example, the PE management component 340 could log the detected error in a database managed by the PE management component 340. Such an error record could then be used, for instance, to calculate a rate of error for a particular operator over some period of time. As another example, the error record could be used to determine a total number of errors generated by an operator over some period of time. Such determinations could then be used to determine whether to prevent subsequent executions of the operator.

In the depicted example, the PE management component 340 is configured to calculate a rate of error for the operator (step 530). Generally, the rate of error is calculated over some period of time. For example, the PE management component 340 could be configured to use a predetermined period of time in calculating the rate of error. In calculating the rate of error, the PE management component 340 may use not only the most recently detected error but could also use any other errors generated by the operator during the period of time.

The PE management component 340 then determines whether the calculated error rate for the operator exceeds a threshold rate of error (step 535). In other embodiments, the PE management component 340 may be configured to determine whether the total number of errors generated by the operator within a window of time exceeds a threshold amount of errors and, if so, can prevent subsequent executions of the operator. Additionally, as discussed above, the PE management component 340 can also be configured to consider the type of error that was detected. For example, upon detecting that the operator has generated a first type of error, the PE management component 340 could prevent subsequent execution of the operator in order to conserve system resources. Such an embodiment may be advantageous, for instance, when a particularly severe type of error is detected.

Returning to the depicted embodiment, if the PE management component 340 determines that the calculated rate of error does not exceed the threshold rate of error, the method 500 returns to step 515, where the PE management component 340 continues monitoring operators in the stream computing application. On the other hand, if the PE management component 340 determines that the calculated rate of error does exceed the threshold rate of error, the PE management component 340 remotes the operator from the operator graph for the stream computing application (step 540). Additionally, the PE management component 340 may also terminate subsequent execution of the removed operator. For example, in an embodiment where each operator is implemented using one or more threads within a processing element process, the PE management component 340 could terminate the one or more threads corresponding to the removed operator. Additionally, if the processing element contains no other operators besides the removed operator, the PE management component 340 could be configured to terminate the process for the processing element in order to further conserve system resources. That is, because the processing element contains no operators once the problematic operator is removed, the processing element may no longer be useful to the stream computing application and thus can be terminated to avoid wasting system resources.

Once the problematic operator is removed from the operator graph, the PE management component 340 generates a notification specifying the removed operator (step 545). Such a notification could then be, for instance, transmitted to a system administrator of the stream computing application to alert the administrator that the PE management component 340 has removed an operator from the stream computing application. Such a notification may be useful, for instance, as the administrator may be able to correct the problem with the removed operator and then reintroduce the operator into the stream computing application. Once the notification is generated, the method 500 ends. Advantageously, the method 500 allows for operators that are no longer producing meaningful output to be detected and removed from the stream computing application, so as to conserve the system resources used to execute the stream computing application.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a stream computing application configured with a PE management component could execute across one or more nodes within the cloud. The PE management component application could monitor operators within the stream computing application to detect errors generated by the operators. Upon detecting that a first one of the operators has generated an error, the PE management component could determine whether to prevent subsequent executions of the operator and, if so, could modify an operator graph for the stream computing application to prevent data flowing to or from the problematic operator. Doing so provides an enhanced stream computing application which users may access from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
   a processor; and
   a memory containing a program that, when executed by the processor, performs an operation for managing errors within an application, comprising:
   monitoring errors occurring in each of a plurality of portions of the application while the application is executing, wherein the monitored errors include at least one of exceptions, errors in a log file, errors in a database, and standard output errors;
   determining types of errors for a plurality of errors detected during a predetermined period of time for a first portion of the application, wherein a first type of error affects validity of an output of the first portion of the application;
   calculating an error rate for errors of the first type in the plurality of errors; and
   determining whether to prevent subsequent executions of the first portion of the application, based on the determined types of errors and a determination whether the calculated error rate exceeds a threshold rate of error, comprising:
   upon determining that the types of errors do not impact the validity of the output of the first portion of the application, permitting subsequent executions of the first portion of the application; and
   upon determining that the types of errors impact the validity of the output of the first portion of the application, preventing subsequent executions of the first portion of the application.

2. The system of claim 1, wherein the application is a stream computing application configured to process data using a plurality of processing elements, each of the plurality of processing elements including one or more operators, wherein an operator graph for the plurality of processing elements defines at least one execution path and wherein at least one of the operators of the operator graph is configured to receive data from at least one upstream operator and transmit data to at least one downstream operator, and wherein each of the portions in the plurality of portions of the application comprises one of the operators in one of the plurality of processing elements.

3. The system of claim 2, wherein the first portion of the application comprises a first operator, and the operation further comprising:
   upon determining to prevent subsequent executions of the first operator, modifying the operator graph to remove the first operator from the operator graph, such that no data is routed to or from the first operator.

4. The system of claim 1, wherein determining whether to prevent subsequent executions of the first portion of the application further comprises:
   retrieving a plurality of error profiles, wherein each error profile specifies one or more conditions which, if satisfied by one of the plurality of portions of the application, indicates that subsequent executions of the one of the plurality of portions are to be prevented; and upon detecting the plurality of errors occurring in the first portion, determining whether one or more of the plurality of error profiles are satisfied based on the detected errors.

5. The system of claim 1, wherein determining whether to prevent subsequent executions of the first portion of the application further comprises:
   upon detecting the plurality of errors occurring in the first portion, determining a number of errors generated by the first portion over a predetermined period of time; and
   upon determining that the number of errors exceeds a threshold amount of errors, determining that subsequent executions of the first portion of the application are to be prevented.

6. The system of claim 1, wherein determining types of errors occurring during the predetermined period of time for the first portion of the application further comprises:
   determining a plurality of errors occurring during the predetermined period of time for the first portion of the application; and
   determining a plurality of distinct error types corresponding to the determined plurality of errors.

7. The system of claim 1, wherein determining that the types of errors do not impact the validity of the output of the first portion of the application further comprises:
   upon determining that a first error occurring during the predetermined period of time indicates that one or more incoming data values are outside of a predefined range of data values, determining that the first error does not impact the validity of the output.

8. The system of claim 1, wherein determining that the types of errors impact the validity of the output of the first portion of the application further comprises:
   upon determining that a first error occurring during the predetermined period of time indicates that a resource relied upon by the first portion of the application is unavailable, determining that the first error impacts the validity of the output.

9. A computer program product for managing errors within an application, comprising:
   a computer-readable storage medium having computer readable program code embodied therewith, the computer readable program code comprising:
   computer readable program code to monitor errors occurring in each of a plurality of portions of the application while the application is executing, wherein the monitored errors include at least one of exceptions, errors in a log file, errors in a database, and standard output errors;
   computer readable program code to determine types of errors for a plurality of errors detected during a predetermined period of time for a first portion of the application, wherein a first type of error affects validity of an output of the first portion of the application;
   computer readable program code to calculate an error rate for errors of the first type in the plurality of errors; and
   computer readable program code to determine whether subsequent executions of the first portion of the application are to be prevented, based on the determined types of errors and a determination whether the calculated error rate exceeds a threshold rate of error, comprising:
   computer readable program code to, upon determining that the types of errors do not impact the validity of the output of the first portion of the application, determine that subsequent executions of the first portion of the application are not to be prevented; and
   computer readable program code to, upon determining that the types of errors impact the validity of the output of the first portion of the application, determine that subsequent executions of the first portion of the application are to be prevented.

10. The computer program product of claim 9, wherein the application is a stream computing application configured to process data using a plurality of processing elements, each of the plurality of processing elements including one or more operators, wherein an operator graph for the plurality of processing elements defines at least one execution path and wherein at least one of the operators of the operator graph is configured to receive data from at least one upstream operator and transmit data to at least one downstream operator, and wherein each of the portions in the plurality of portions of the application comprises one of the operators in one of the plurality of processing elements.

11. The computer program product of claim 10, wherein the first portion of the application comprises a first operator, and the computer readable program code further comprising:
   computer readable program code to, upon determining to prevent subsequent executions of the first operator, modify the operator graph to remove the first operator from the operator graph, such that no data is routed to or from the first operator.

12. The computer program product of claim 9, wherein the computer readable program code to determine whether to prevent subsequent executions of the first portion of the application further comprises:
   computer readable program code to retrieve a plurality of error profiles, wherein each error profile specifies one or more conditions which, if satisfied by one of the plurality of portions of the application, indicates that subsequent executions of the one of the plurality of portions are to be prevented; and
   computer readable program code to, upon detecting the plurality of errors occurring in the first portion, determine whether one or more of the plurality of error profiles are satisfied based on the detected errors.

13. The computer program product of claim 9, wherein the computer readable program code to determine whether to prevent subsequent executions of the first portion of the application further comprises:
   computer readable program code to, upon detecting the plurality of errors occurring in the first portion, determine a number of errors generated by the first portion over a predetermined period of time; and
   computer readable program code to, upon determining that the number of errors exceeds a threshold amount of errors, determine that subsequent executions of the first portion of the application are to be prevented.

* * * * *